United States Patent [19]
Stephenson

[11] Patent Number: 5,335,166
[45] Date of Patent: Aug. 2, 1994

[54] METHOD OF OPERATING A SAND SCREW

[75] Inventor: Stanley V. Stephenson, Duncan, Okla.

[73] Assignee: Halliburton Company, Duncan, Okla.

[21] Appl. No.: 825,229

[22] Filed: Jan. 24, 1992

[51] Int. Cl.$^5$ ............................................. G06F 15/46
[52] U.S. Cl. .................................... 364/166; 364/172; 222/55; 198/657
[58] Field of Search ............... 364/166, 151, 502, 510, 364/509, 172–175; 222/55; 366/20; 198/657, 670, 675; 137/88, 3

[56] References Cited

U.S. PATENT DOCUMENTS

| | | | |
|---|---|---|---|
| 4,538,222 | 8/1985 | Crain et al. | 364/172 |
| 4,779,186 | 10/1988 | Handke et al. | 364/172 |
| 4,830,508 | 5/1989 | Higuchi et al. | 366/20 X |
| 4,916,631 | 4/1990 | Crain et al. | 364/502 |
| 4,953,097 | 8/1990 | Crain et al. | 364/502 |
| 5,027,267 | 6/1991 | Pitts et al. | 364/172 |
| 5,042,539 | 8/1991 | McGregor | 222/55 X |
| 5,089,975 | 2/1992 | Mannion et al. | 364/510 |

OTHER PUBLICATIONS

James, M. L., Smith, G. M., Wolford, J. C.; Applied Numerical Methods for Digital Computation; Second Ed.; Harper & Row; New York 1977.

Primary Examiner—Jerry Smith
Assistant Examiner—Brian C. Oakes
Attorney, Agent, or Firm—James R. Duzan; E. Harrison Gilbert, III

[57] ABSTRACT

A method of operating a sand screw comprises: sensing speed of a sand screw delivering sand; determining a corrected delivery rate of sand, including converting the sensed speed of the sand screw into the corrected delivery rate of sand in response to predetermined sand screw delivery rate conversion data; and controlling the speed of the sand screw in response to the corrected delivery rate of sand. The sand screw delivery rate conversion data is based on first and second order polynomials defining the relationship between conventionally determined indicated sand screw delivery rates (i.e., using sand screw speed and a selected calibration factor) and actual delivery rates based on measured sand output.

10 Claims, 3 Drawing Sheets

METHOD OF OPERATING A SAND SCREW

BACKGROUND OF THE INVENTION

This invention relates generally to a method of operating a sand screw. The method of the present invention compensates for calibration errors which typically arise when only a selected calibration factor is used in controlling the operation of a sand screw.

A sand screw is a machine for conveying sand from an inlet where sand free falls out of a hopper onto an auger-like implement (i.e., the "screw") that moves the sand to an outlet of the sand screw. At least in the oil and gas industry, the outlet is typically above a tub so that the sand drops into the tub for mixing with a liquid pumped into the tub from another source. This is, broadly, a typical way in which a fracturing fluid is made prior to being pumped into a well for fracturing a formation to increase production of oil or gas out of the fractured formation. Once pumped downhole in the fracturing fluid, the sand becomes a propping agent which holds the formation open after it has been fractured by the hydraulic pressure of the fluid.

The mixture of the fracturing fluid is typically controlled using a computer for, in effect, calculating sand concentration of the mixture, comparing the calculated concentration with a desired concentration and generating a control signal to adjust the speed of the sand screw depending on any difference between the calculated concentration and the desired concentration. This control is based on the sensed flow of liquid into the tub and on the quantity or rate of sand moved by the sand screw as determined by the sensed speed of the sand screw and a selected calibration factor.

A transducer provides a signal indicating the sand screw speed, and the computer uses the calibration factor to convert the speed into a sand quantity or delivery rate. For example, if a transducer provides a series of pulses, the calibration factor typically specifies how many pulses per pound of sand; therefore, dividing the counted pulses by the calibration factor gives the number of pounds of sand delivered by the sand screw. Taking this over a selected time period gives the delivery rate. Alternatively, if the transducer signal were used to represent revolutions per minute of the screw, the calibration factor would specify how many pounds of sand are moved per revolution; therefore, multiplying the revolutions per minute by the calibration factor gives the delivery rate. Multiplying also by time would give the number of pounds of sand.

In the existing system I am aware of for operating a sand screw to control its speed so that a desired concentration can be obtained, one calibration factor is used for a given job. That is, a single number is used as the divisor or multiplier to obtain a quantity of sand or delivery rate of sand value regardless of the speed at which the sand screw is operating. This produces errors because a sand screw does not deliver sand at a constant rate throughout the range of speeds at which the sand screw can operate. This will be more fully explained below, but at present it is sufficient to note that such errors exist, and such errors can be detrimental because they can cause a mixture having an undesired actual concentration to be produced. In the example of the mixture being a fracturing fluid, such incorrect concentration can adversely affect the fracturing job and the resultant productivity of the well. Thus, there is the need for an improved method of operating a sand screw which compensates for such errors.

SUMMARY OF THE INVENTION

The present invention overcomes the above-noted and other shortcomings of the prior art by providing a novel and improved method of operating a sand screw. This method compensates for the errors which would tend to arise if only one calibration factor were used in the manner described above. The method of the present invention takes into account the dynamics of the sand screw throughout its operating range of speeds.

The method of the present invention broadly comprises: sensing speed of a sand screw delivering sand; determining a corrected delivery rate of sand, including converting the sensed speed of the sand screw into the corrected delivery rate of sand in response to predetermined sand screw delivery rate conversion data; and controlling the speed of the sand screw in response to the corrected delivery rate of sand.

The foregoing can be accomplished by: providing to a computer a first signal, the first signal indicating speed of a sand screw delivering sand; converting the first signal in the computer into a second signal, the second signal representing an uncorrected rate of sand delivery; converting the second signal in the computer into a third signal, the third signal representing a corrected rate of sand delivery; and generating a control signal in response to the third signal and providing the control signal to the sand screw for controlling the speed of the sand screw.

The present invention more particularly provides a method of operating a sand screw with the aid of a digital computer, comprising: providing the computer with a data base including at least a desired sand concentration value, a selected sand screw calibration factor, and sand screw delivery rate conversion data; determining the flow rate of a fluid; determining the speed of the sand screw delivering sand into the fluid; calculating in the computer a corrected sand delivery rate of the sand, including: computing an indicated sand delivery rate in response to the selected sand screw calibration factor and the determined speed of the sand screw; and converting the indicated sand delivery rate to the corrected sand delivery rate in response to the indicated sand delivery rate and the sand screw delivery rate conversion data; and controlling the speed of the sand screw in response to the corrected sand delivery rate, the determined flow rate of the fluid and the desired sand concentration value. In a particular embodiment, the sand screw delivery rate conversion data includes a first order polynomial and a second order polynomial. In this embodiment, converting the indicated sand delivery rate includes solving in the computer the first order polynomial using the computed indicated sand delivery rate when the sensed speed is less than the speed of the sand screw equivalent to the free fall time of sand in the sand screw and solving in the computer the second order polynomial using the computed indicated sand delivery rate when the sensed speed is greater than the speed of the sand screw equivalent to the free fall time of sand in the sand screw.

Therefore, from the foregoing, it is a general object of the present invention to provide a novel and improved method of operating a sand screw. Other and further objects, features and advantages of the present invention will be readily apparent to those skilled in the art when the following description of the preferred

BRIEF DESCRIPTION OF THE DRAWINGS

FIG. 5 is a graph showing error percentages for a prior method of operating a sand screw and for the method of the present invention.

DETAILED DESCRIPTION OF PREFERRED EMBODIMENT

Figure 1:
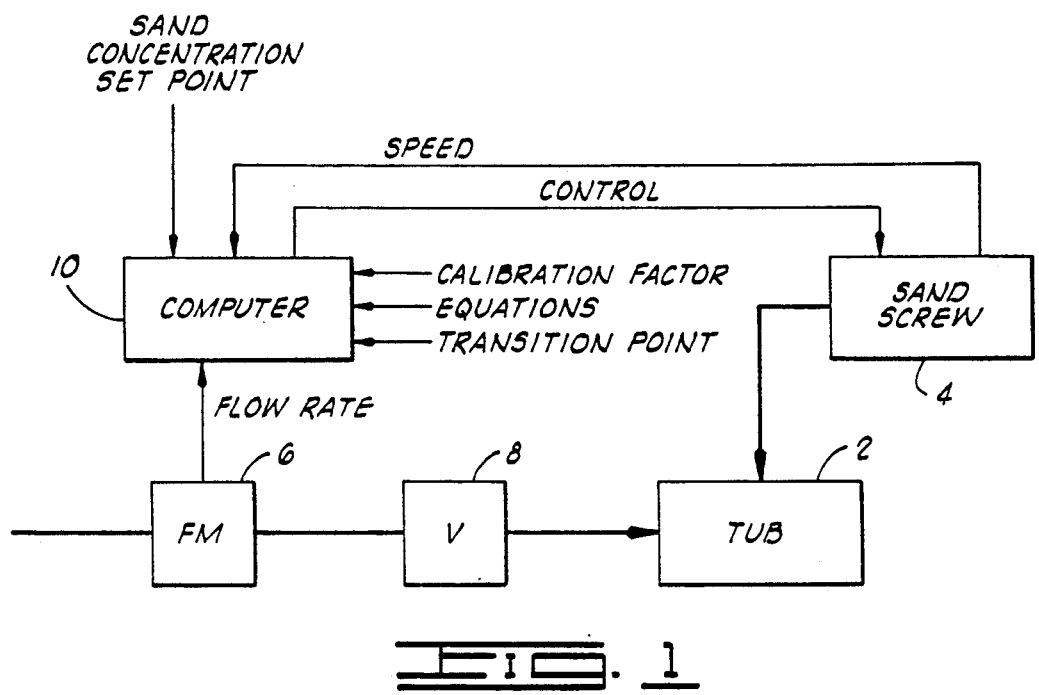
FIG. 1 is a block diagram of a mixing system in which a sand screw is operated in accordance with the present invention.

A mixing system such as can be used at an oil or gas well site for mixing a fracturing fluid is represented in FIG. 1. A tub 2 receives sand, which serves as a proppant once the fracturing fluid is pumped into the well, from a sand screw 4. The sand mixes with a liquid received in the tub 2 from a suitable source (not shown but well known in the art). The flow rate of the liquid as it is pumped into the tub 2 is sensed by a flow meter 6 and controlled by a valve 8. The speed of the sand screw 4, and thus the quantity and rate of delivery of sand from the sand screw 4 into the tub 2, is controlled by a computer 10. All of these components of the preferred embodiment are implemented with hardware known in the art. For example, these components, except as modified as described hereinbelow, can be found in or associated with the prior Halliburton Services ARC System (e.g., the computer 10 can be implemented using the ARC unit controller).

The computer 10, as used in the prior art system, responds to a signal from the flow meter 6 indicating the flow rate of the liquid, a signal from a speed sensing transducer on the sand screw 4 indicating the speed of the sand screw 4, a signal entered in the computer 10 indicating a selected calibration factor for the sand screw 4, and a signal entered in the computer 10 indicating a desired concentration of sand in the liquid (i.e., a sand concentration set point). The sand screw speed and the calibration factor are used for computing the quantity of sand delivered into the tub 2. Relative to a selected time period, this yields the rate of sand delivery. This taken with the flow rate allows the computer 10 to calculate the computed concentration (e.g., by dividing the sand delivery rate by the flow rate). The computer 10 compares the computed concentration with the desired concentration and generates a control signal as needed. The control signal is communicated to the sand screw 4 to adjust its speed to try to make a subsequently computed concentration equal the desired concentration.

Figure 2:
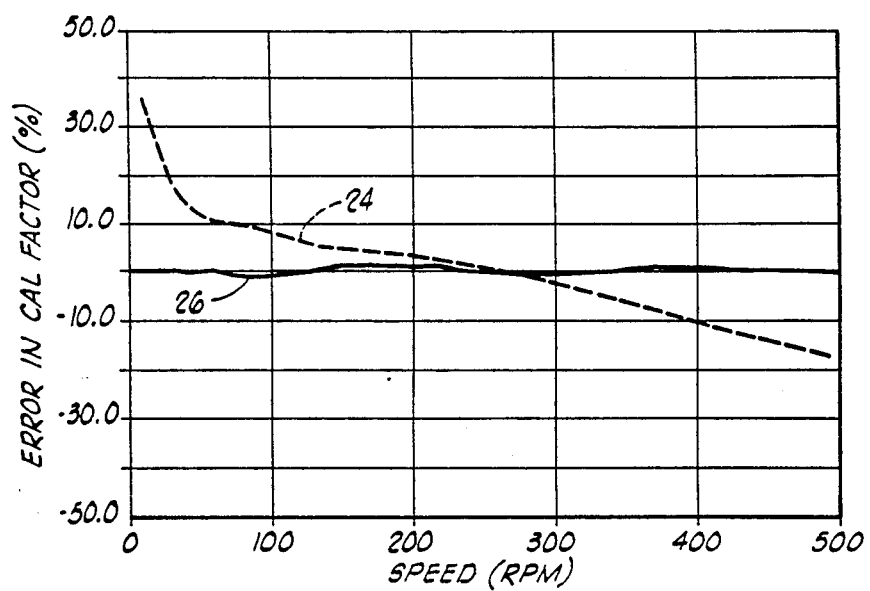
FIG. 2 is a graph showing the non-linear relationship between sand screw calibration factors and sand screw speed.
Figure 2:
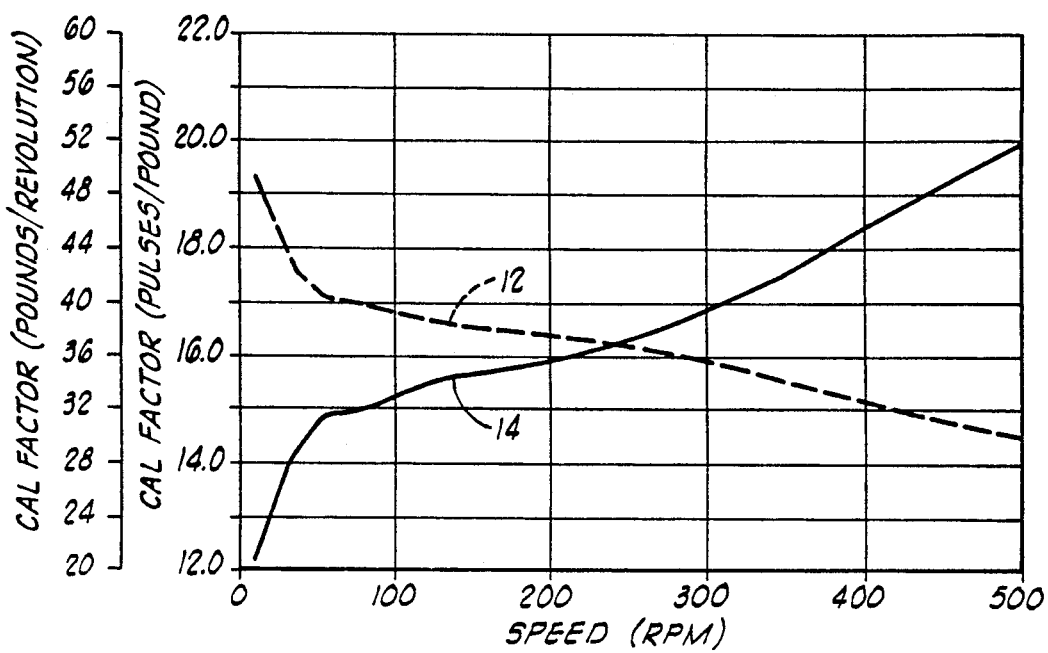

In the prior art system, only one selected calibration factor is used for a given job regardless of the sensed sand screw speed. Referring to FIG. 2, it will be seen that this introduces error because the response of a sand screw is not constant throughout its operating range of speeds. Line 12 in FIG. 2 indicates, for a 12-inch high capacity sand screw, the appropriate calibration factors in units of pounds of sand per revolution of the auger-like implement (i.e., the "screw") of the sand screw 4 throughout the designated range of speeds. Line 14 in FIG. 2 indicates the calibration factors in units of pulses in the speed indicating signal per pound of sand. For either type of calibration factor, FIG. 2 shows that selecting a single one and using it regardless of the sensed speed of the sand screw 4 will produce an incorrect calculation of the amount or rate of sand delivered if it is delivered at other than the particular speed for which the selected calibration factor is correct. Although such error can, at least in some instances, be reduced by operating the sand screw within a limited speed range and using an average calibration factor for the range, error would still likely occur.

For the same 12-inch high capacity sand screw to which FIG. 2 pertains, I have observed the sand screw's response from another point of view. This point of view compares what is actually output to what is computed by the prior art system as the output. With regard to the sand screw to which FIG. 2 pertains, I will refer to the prior art computed output based on a single calibration factor as the indicated rate. Indicated rates using a selected calibration factor of 30 pounds per revolution are marked along the x-axis of the graph of FIG. 3. Thus, these indicated rates are those that would be used in the prior art system as the "actual" rate; however, these are not accurate valuations due to the variation in the sand screw response as explained above. Therefore, I refer to these indicated rates also as uncorrected delivery rates. They need to be corrected or compensated to give a more accurate "actual" output value.

Figure 3:
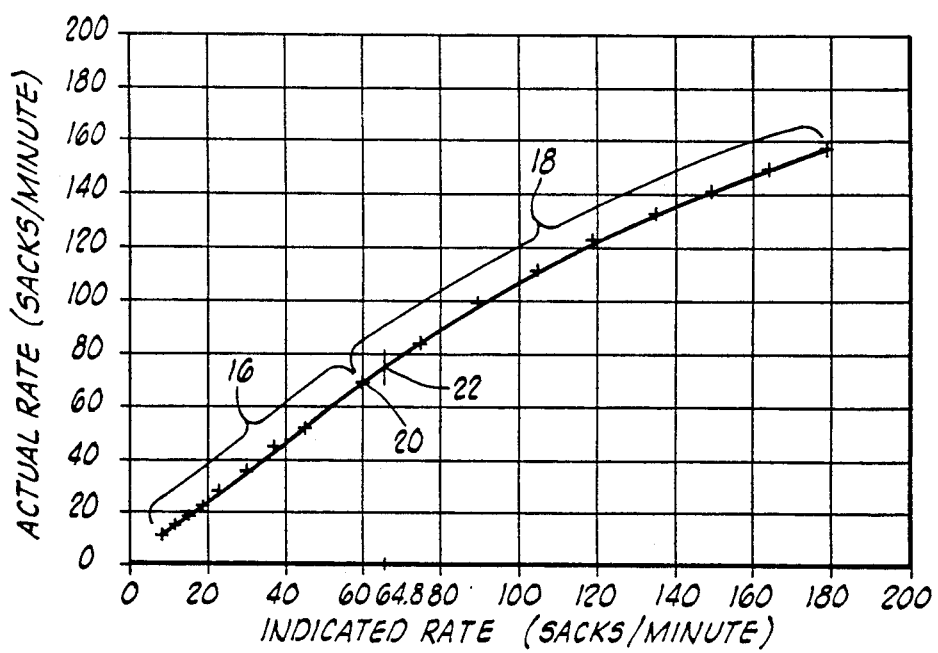
FIG. 3 is a graph showing the relationship between actual sand delivery rates and indicated rates determined using a selected calibration factor.

To determine what compensation is needed, I have measured actual outputs of the sand screw to which FIGS. 2 and 3 relate. These actual rates were determined with a known nuclear weigh scale technique using density and conveyor belt speed for carefully measuring the amount of sand obtained on a conveyor belt positioned to receive the output of the sand screw. The data obtained are marked on the graph of FIG. 3 with the "+" symbols. Thus, the ultimate compensation needed is to relate the measured actual rates to the currently used uncorrected, indicated rates and provide for converting any uncorrected, indicated rate to its corrected, actual rate.

By plotting the actual delivery rate versus indicated delivery rate, I have observed that a lefthand portion 16 of a line fitted to the plotted data of FIG. 3 is linear and a righthand portion 18 of the line fitted to the plotted data is curved. The rapid change of calibration factor in the corresponding lefthand region of the lines 12, 14 in FIG. 2 and the linearity in the region 16 of FIG. 3 suggests that there is a constant offset in the sand delivery rate that manifests itself as a large error at the lower rates and as a smaller error as the rate increases. This is verified by my having been able to fit a straight line (i.e., a first order polynomial) with a zero offset through the data in the region 16 with an error of less than one percent. The polynomial fit to region 16 in FIG. 3 is $y = 1.7805 + 1.1171x$, where $y$ is the actual rate value and $x$ is the indicated rate value.

The non-linear region 18 can be attributed to inadequate filling of the screw of the sand screw 4 when it rotates at the higher speeds of this region. This inadequate filling is due to the gravity-caused free fall velocity of sand not being great enough for sand to drop from the top to the bottom of the filling area between passes of the screw's flights. To confirm this, the screw speed required for inadequate filling was calculated to be 64.8 revolutions per minute for the implementation on which FIG. 3 is based [speed=(100 pounds per sack) / (30 pounds per revolution×known free fall time for sand for 12-inch screw)], and the intersection of the linear and curved portions 16, 18 of the curve in FIG. 3 was graphically determined to be approximately 60 revolutions per minute. The small difference between the calculated speed and the graphically determined speed can be attributed to the calculated value not taking into account the sand being slowed by impact between particles. The foregoing reason for inadequate filling was further confirmed by my being able to fit a second order polynomial to the data of region 18 with an error of less than one percent. A second order polynomial dynamically describes the free fall time of a particle. The polynomial fit to region 18 in FIG. 3 is $y = 0.24908 + 1.30251x - 0.00242x^2$.

It is to be noted that the specific equations recited above were empirically determined in relation to the data points marked in FIG. 3. These equations are also correlated to the particular calibration factor used (30 pounds per revolution). That is, for a selected calibration factor, corresponding equations need to be determined. As a screw wears and its efficiency decreases, changing this calibration factor will effectively change both equations in the correct proportions to allow continued accurate calculation of actual rate from indicated rate.

The relationships expressed in FIG. 3 can be implemented by suitably programming the computer 10. This produces calculations that determine the actual sand delivery output, rather than merely a computed sand delivery based solely on one selected calibration factor. Thus, a more accurate determination of the actual concentration can be obtained so that the control signal ultimately generated from a comparison of the actual concentration and the desired concentration causes the sand screw to rotate at a speed which more closely achieves the desired concentration. How this is obtained in the method of the present invention will be described with reference to the computer program flow chart in FIG. 4.

Figure 4:
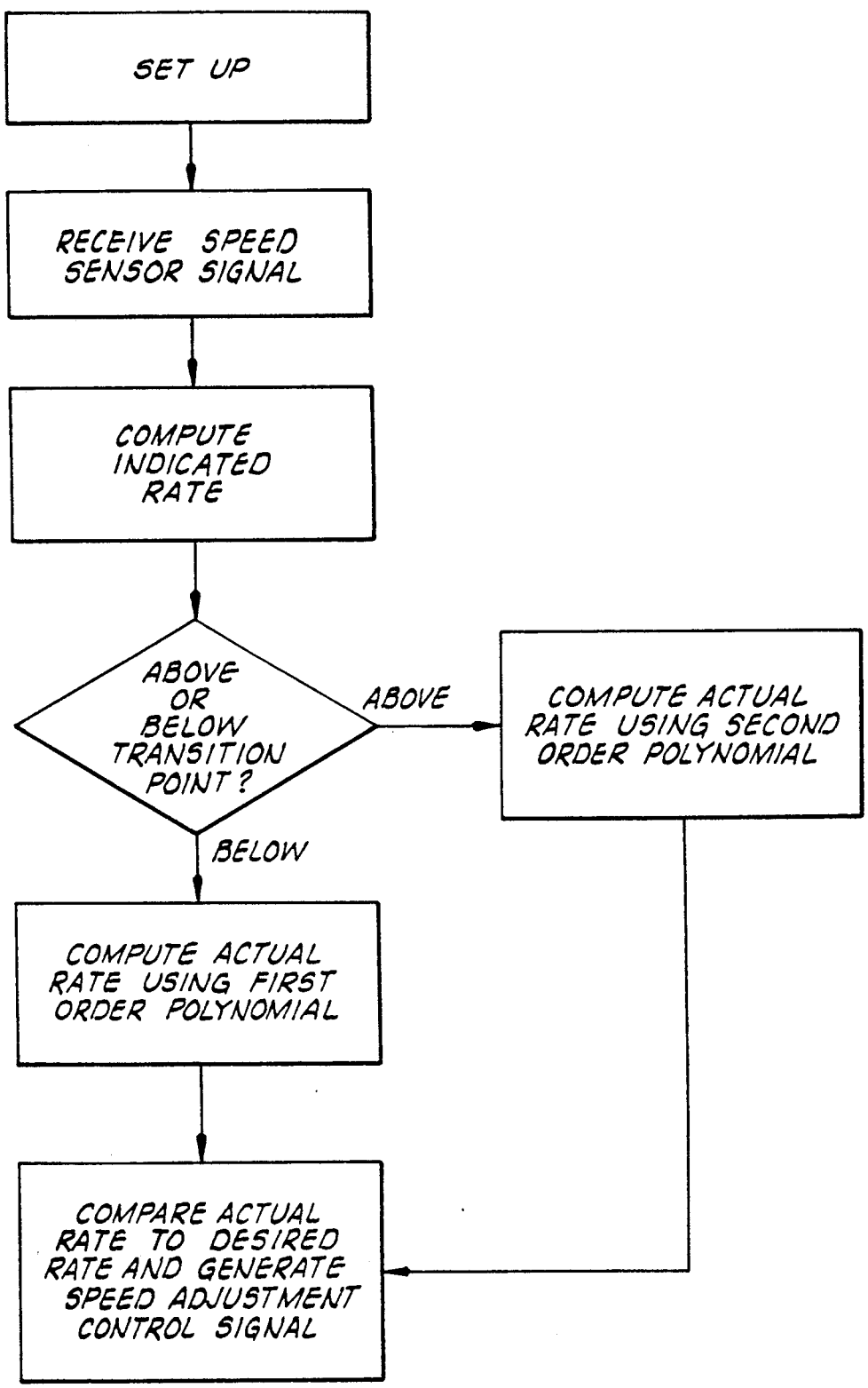
FIG. 4 is a flow chart for a computer program used in implementing the method of the present invention.

Referring to FIG. 4 and the system of the present invention shown in FIG. 1, the computer 10 is set up by providing it with a data base that includes at least the desired sand concentration set point, the selected sand screw calibration factor (such as would be used in the prior art controller), and sand screw delivery rate conversion data. In the preferred embodiment, the conversion data includes the two equations defining the curve shown in FIG. 3 and the transition point distinguishing which equation is to be used. In the preferred embodiment, this transition point is the speed equivalent to the free fall time of sand in the sand screw. This preferably corresponds to the graphically indicated point 20 (FIG. 3) which accounts for the actual operation of the sand screw rather than the mathematically determined theoretical point 22 (FIG. 3) where free fall velocity is calculated to equal the time for consecutive flights of the screw to pass as described above. This information can be entered in the computer 10 in any suitable manner. For example, the equations can be directly used so that the "x" values (uncorrected, indicated rate used also in the prior art system) are determined and used in solving for "y"; or look-up tables can be stored so that when a speed is sensed or indicated rate computed, a previously determined and stored corresponding actual rate can be looked up in the stored table. Implementation of this can be via software coding or manual entry through a keyboard of the computer 10, for example.

Another part of the set up of the preferred embodiment represented in FIG. 4 is to provide to the computer 10 a signal indicating the flow rate of the liquid flowing into the tub 2. This can be done in a conventional manner using the flow meter 6. Typically, the computer 10 receives an electrical signal from the flow meter 6, which signal is encoded in a known manner (such as via its frequency) so that the computer 10 can convert the encoded characteristic of the signal to determine flow rate.

The next block in FIG. 4 shows that the computer 10 receives the speed sensor signal. This preferably comes from a conventional speed transducer on the sand screw 4. As with the signal from the flow meter 6, the speed sensor signal is encoded in a way which can be interpreted by the computer to determine the speed at which the sand screw is operating and delivering sand into the tub 2 for the FIG. 1 implementation.

With the entered data base and the flow rate and speed information, the computer 10 determines a corrected delivery rate of sand into the fluid of the tub 2. Broadly speaking, this includes converting the sensed speed of the sand screw into the corrected delivery rate of sand in response to the predetermined sand screw delivery rate conversion data. In response to the corrected delivery rate of sand, the flow rate of the liquid into the tub 2 as determined above, and the desired sand concentration value, the speed of the sand screw is controlled. These steps are implemented by the remaining programming represented in FIG. 4.

Via this remaining programming, the computer 10 computes the indicated sand delivery rate in conventional manner using the sensed speed of the sand screw and the entered, selected calibration factor. As mentioned above, this indicated rate value can be referred to as the uncorrected rate of sand delivery. The computed indicated rate is the "x" value for the equations set forth hereinabove.

Once the uncorrected or indicated sand delivery rate is computed, the computer 10 converts it into the corrected sand delivery rate. How this occurs depends on whether the computed indicated rate is below (less than) or above (greater than) the transition point (i.e., the speed of the sand screw equivalent to the free fall time of sand in the sand screw as described above). If below, the conversion includes solving in the computer 10 the first order polynomial represented in the predetermined sand screw delivery rate conversion data using the computed indicated sand delivery rate. If above, the conversion includes solving in the computer 10 the second order polynomial using the computed indicated sand delivery rate. "Solving" as used in the foregoing includes a direct use of the equations defining the relationship represented in FIG. 3 within the computer 10, or an indirect use as via a look-up table, or as otherwise may be implemented to obtain the actual rate of sand delivery used in the present invention to more accurately control the sand screw speed.

Whichever polynomial or equation is used, the actual rate derived therefrom is, as indicated in FIG. 4, compared to the desired rate (which can be done by determining actual concentration and comparing to the desired sand concentration set point or by determining a desired sand delivery rate from the desired concentration and actual flow rate and comparing the desired rate to the actual rate). A control signal is generated as needed to adjust the speed of the sand screw. Such comparison and generation are done in known manner, such as are done in the prior art system referred to herein.

Using the foregoing method, improved control is obtained, thereby yielding improved accuracy in creating a mixture in the tub 2 of the desired concentration. This improvement is represented in FIG. 5 wherein a line 24 shows the percent error for the prior art technique that uses only one selected calibration factor for a given job and wherein a line 26 indicates the corresponding percent error arising from the present invention which compensates for inaccuracies arising from using only a single calibration factor. The specific calibration factor used to determine line 24 of FIG. 5 was 36.4 pounds per revolution.

Thus, the present invention is well adapted to carry out the objects and attain the ends and advantages mentioned above as well as those inherent therein. While a preferred embodiment of the invention has been described for the purpose of this disclosure, changes in the performance of steps can be made by those skilled in the art, which changes are encompassed within the spirit of this invention as defined by the appended claims.

What is claimed is:

1. A method of operating a sand screw, comprising:
   sensing speed of a sand screw delivering sand; determining a corrected delivery rate of sand, including converting the sensed speed of the sand screw into the corrected delivery rate of sand in response to predetermined sand screw delivery rate conversion data having a first-order polynomial equation and a second-order polynomial equation; and
   controlling the speed of the sand screw in response to the corrected delivery rate of sand by using at least one coefficient of the first-order polynomial equation when the sensed sand screw speed is less than a sand screw speed commensurate with the free fall of sand in the sand screw and by using at least one coefficient of the second-order polynomial equation when the sensed sand screw speed is greater than the speed commensurate with the free fall of sand in the sand screw.

2. A method as defined in claim 1, wherein the polynomial equations are empirically predetermined in correlation with a selected sand screw calibration factor.

3. A method of operating a sand screw, comprising:
   sensing speed of a sand screw delivering sand;
   determining a corrected delivery rate of sand, including converting the sensed speed of the sand screw into the corrected delivery rate of sand in response to predetermined sand screw delivery rate conversion data; and
   controlling the speed of the sand screw in response to the corrected delivery rate of sand by computing an indicated rate using the sensed speed and a predetermined calibration factor and computing the corrected delivery rate using the indicated rate and a first predetermined equation when the sensed speed is less than the speed of the sand screw commensurate to the free fall time of sand in the sand screw and using a second predetermined equation when the sensed speed is greater than the speed of the sand screw commensurate to the free fall time of sand in the sand screw.

4. A method of operating a sand screw, comprising:
   providing to a computer a first signal, the first signal indicating speed of a sand screw delivering sand;
   converting the first signal in the computer into a second signal in response to a predetermined calibration factor, the second signal representing an uncorrected rate of sand delivery;
   converting the second signal in the computer into a third signal in correspondence with a relationship defined by a predetermined equation, the third signal representing a corrected rate of sand delivery;
   providing to the computer a fourth signal, the fourth signal representing a flow rate of a fluid;
   providing to the computer a fifth signal, the fifth signal representing a desired concentration of sand in the fluid; and
   generating a control signal in response to the third, fourth, and fifth signals and providing the control signal to the sand screw for controlling the speed of the sand screw when the sand screw speed is greater than or lesser than a speed commensurate with the free fall of sand in the sand screw.

5. A method as defined in claim 4, wherein the predetermined equation is selected in response to the second signal from either a predetermined first order polynomial or a predetermined second order polynomial.

6. A method as defined in claim 5, wherein the first order polynomial and the second order polynomial are predetermined in correlation with the predetermined calibration factor.

7. A method as defined in claim 4, wherein the predetermined equation is selected in response to the second signal from either a predetermined first-order polynomial equation or a predetermined second-order polynomial equation.

8. A method as defined in claim 7, wherein the first-order polynomial equation and the second-order polynomial equation are predetermined in correlation with the predetermined calibration factor.

9. A method of operating a sand screw with the aid of a digital computer, comprising:
   providing the computer with a data base including at least a desired sand concentration value, a selected sand screw calibration factor, and sand screw delivery rate conversion data having a first-order polynomial equation and a second-order polynomial equation;
   determining the flow rate of a fluid;
   determining the speed of the sand screw delivering sand into the fluid;
   calculating in the computer a corrected sand delivery rate of the sand, including:
   computing an indicated sand delivery rate in response to the selected sand screw calibration factor and the determined speed of the sand screw; and
   converting the indicated sand delivery rate to the corrected sand delivery rate in response to the indicated sand delivery rate and the sand screw delivery rate conversion data by solving in the computer the first-order polynomial equation using the computed indicated sand delivery rate when the sensed sand screw speed is less than a sand screw speed commensurate with the free fall of sand in the sand screw and by solving in the computer the second-order polynomial equation using the computed indicated sand delivery rate when the sensed sand screw speed is greater than the speed commensurate with the free fall of sand in the sand screw; and
   controlling the speed of the sand screw in response to the corrected sand delivery rate, the determined flow rate of the fluid and the desired sand concentration value.

10. A method as defined in claim 9, wherein the polynomial equations are empirically predetermined in correlation with the sand screw calibration factor.

* * * * *